(12) United States Patent
Achi Vasudevan et al.

(10) Patent No.: US 12,248,494 B2
(45) Date of Patent: Mar. 11, 2025

(54) HIGH AVAILABILITY COMPUTING CLUSTERS

(71) Applicant: Hewlett Packard Enterprise Development LP, Spring, TX (US)

(72) Inventors: Pradeep Kumar Achi Vasudevan, Bangalore (IN); Sonu Sudhakaran, Bangalore (IN); Santosh Nagaraj, Bangalore (IN); Hardik Dhirendra Parekh, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/335,592

(22) Filed: Jun. 15, 2023

(65) Prior Publication Data

US 2024/0419684 A1 Dec. 19, 2024

(51) Int. Cl.
*G06F 16/27* (2019.01)
(52) U.S. Cl.
CPC .................................. *G06F 16/27* (2019.01)
(58) Field of Classification Search
CPC .. G06F 16/27; G06F 3/067; G06F 2009/4557; G06F 3/065
USPC .......................... 707/610, 613, 626, 634, 737
See application file for complete search history.

(56) References Cited

U.S. PATENT DOCUMENTS

| | | | |
|---|---|---|---|
| 7,623,472 B2 * | 11/2009 | Samanta | ................ H04L 67/10 370/254 |
| 10,778,798 B2 | 9/2020 | Parekh | |
| 10,827,020 B1 | 11/2020 | Cao et al. | |
| 10,848,552 B2 | 11/2020 | Shimoga Manjunatha et al. | |
| 10,860,444 B2 | 12/2020 | Natanzon | |
| 10,908,999 B2 | 2/2021 | Natanzon et al. | |
| 10,949,239 B2 | 3/2021 | Gupta et al. | |
| 11,108,629 B1 | 8/2021 | Cahyadi et al. | |
| 11,169,856 B2 | 11/2021 | Parekh et al. | |
| 11,861,415 B1 * | 1/2024 | Ni | ........................ G06F 9/5072 |

(Continued)

OTHER PUBLICATIONS

IBM, "Being Frugal with Kubernetes Operators Part 2: Scaling Controllers to Zero," https://www.ibm.com/cloud/blog/being-frugal-with-kubernetes-operators-part-2, Jul. 3, 2019, 7 pages.

(Continued)

*Primary Examiner* — Phong H Nguyen
(74) *Attorney, Agent, or Firm* — Slater Matsil, LLP

(57) ABSTRACT

In an example implementation consistent with the features disclosed herein, high availability of a stateful application is achieved by orchestrating multiple computing clusters. A stateful application is deployed at a first application operator and a second application operator of a first computing cluster and a second computing cluster, respectively. The first application operator includes a first control loop that changes the first computing cluster based on first resources of the first computing cluster. The second application operator includes a second control loop that changes the second computing cluster based on second resources of the second computing cluster. Synchronization of the first resources with the second resources is configured, such as via an object storage service. The first application operator and the second application operator are scaled to, respectively, non-zero and zero. A load balancer is configured to route requests to the first computing cluster.

12 Claims, 6 Drawing Sheets

(56) References Cited

U.S. PATENT DOCUMENTS

| | | | |
|---|---|---|---|
| 2002/0025036 A1* | 2/2002 | Sato | H04L 41/28 |
| | | | 380/42 |
| 2002/0133330 A1* | 9/2002 | Loisey | G06F 21/31 |
| | | | 703/27 |
| 2010/0077162 A1* | 3/2010 | Kaneko | G06F 3/0653 |
| | | | 711/E12.001 |
| 2014/0061305 A1* | 3/2014 | Nahill | G06K 7/0095 |
| | | | 235/438 |
| 2014/0327477 A1* | 11/2014 | Chiang | H03L 7/08 |
| | | | 327/156 |
| 2019/0324786 A1* | 10/2019 | Ranjan | G06F 9/45558 |
| 2020/0137029 A1 | 4/2020 | Sakthievel et al. | |
| 2020/0348918 A1 | 11/2020 | Giannetti | |
| 2021/0004292 A1 | 1/2021 | Zlotnick et al. | |
| 2021/0149769 A1 | 5/2021 | Balcha et al. | |
| 2021/0311762 A1 | 10/2021 | Shepherd et al. | |
| 2021/0311763 A1 | 10/2021 | Beard et al. | |
| 2022/0156129 A1 | 5/2022 | Li | |
| 2022/0158912 A1 | 5/2022 | Ikäheimo | |

OTHER PUBLICATIONS

Kubernetes, "Custom Resources," https://kubernetes.io/docs/concepts/extend-kubernetes/api-extension/custom-resources/, last modified Jan. 8, 2022, 5 pages.

Kubernetes, "Operator pattern," https://kubernetes.io/docs/concepts/extend-kubernetes/operator/, last modified Jan. 16, 2023, 2 pages.

Kubernetes, "Kubernetes Operators: Automating Complex Application Lifecycles," https://www.kubermatic.com/blog/kubernetes-operators-automating-complex-application-lifecycles/, Nov. 26, 2020, 6 pages.

Velichko, "Exploring Kubernetes Operator Pattern," https://iximiuz.com/en/posts/kubernetes-operator-pattern/, Jan. 31, 2021, 24 pages.

* cited by examiner

HIGH AVAILABILITY COMPUTING CLUSTERS

BACKGROUND

Container orchestration may be used for automating the deployment, scaling, and management of applications. A container management system may be used to perform container orchestration. A container management system may include a set of primitives that are collectively used for container orchestration across a computing cluster of computing nodes. A computing cluster includes one or more manager nodes (which are part of a control plane) and one or more worker nodes (which are part of a data plane). A manager node of a computing cluster can distribute workloads to worker nodes of the computing cluster, manage the transfer of workloads between the worker nodes, scale workloads up or down, and/or the like by orchestrating application containers on the worker nodes. Application containers are a form of operating system virtualization, where a container includes the minimum operating system resources, memory, and dependencies to run an application.

BRIEF DESCRIPTION OF THE DRAWINGS

Aspects of the present disclosure are best understood from the following detailed description when read with the accompanying figures.

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

Figure 1A:
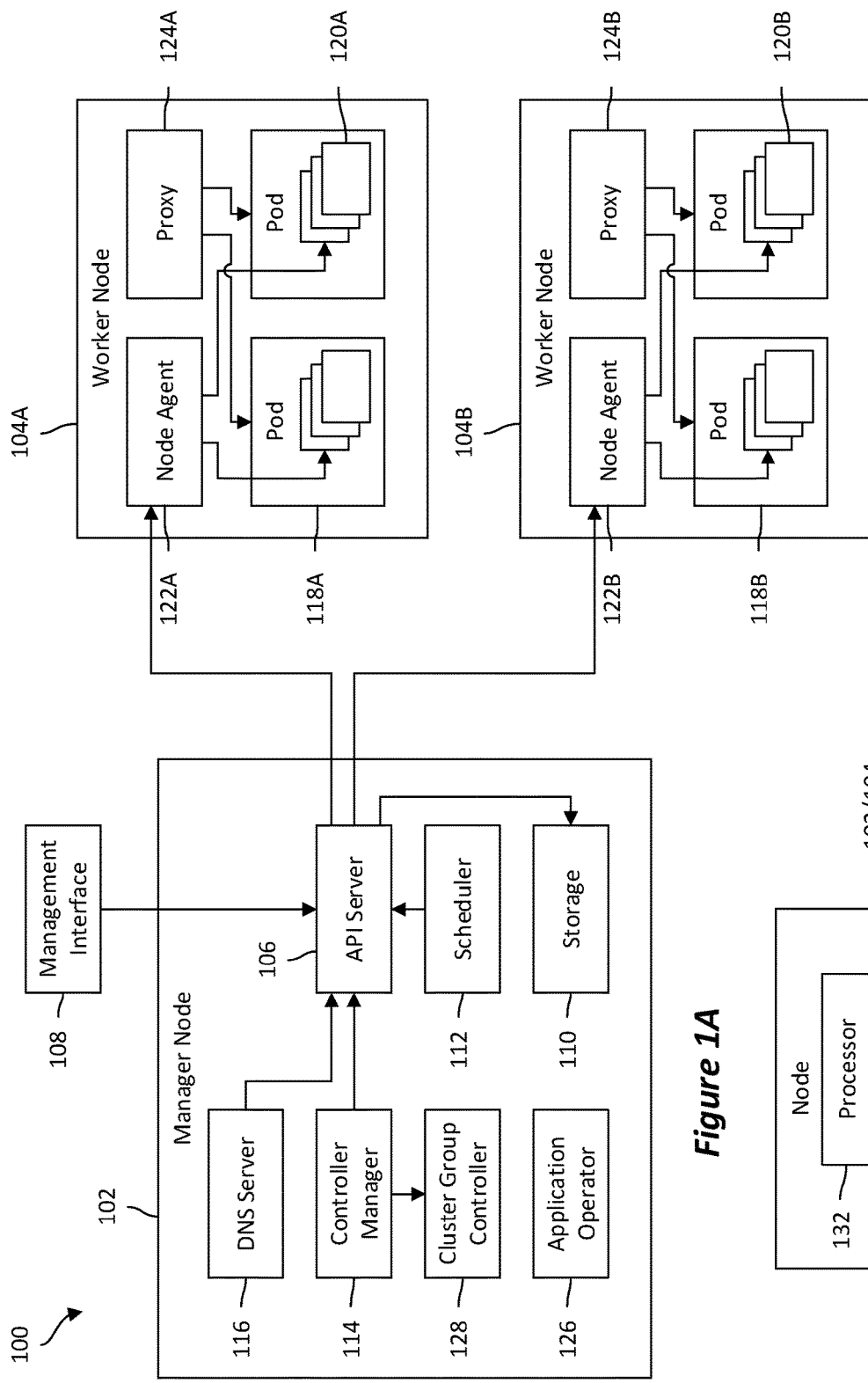
FIGS. 1A-1B are schematic diagrams of a computing cluster, according to some implementations.

The following disclosure provides many different examples for implementing different features. Specific examples of components and arrangements are described below to simplify the present disclosure. These are, of course, merely examples and are not intended to be limiting.

Container management systems are suitable for orchestrating cloud computing workloads, and so may be used in public clouds (which may be publicly accessible) and/or private clouds (which may not be publicly accessible). For example, a container management system may be used at an on-premises data center for an enterprise to orchestrate containers across a cluster of on-premises nodes. The enterprise may use such a container management system to orchestrate applications on a private cloud. An application that is orchestrated on a computing cluster may be stateless application or a stateful application. A stateless application operates without using domain-specific knowledge of the computing cluster. A stateful application operates using domain-specific knowledge of the computing cluster. An enterprise may desire to achieve high availability (HA) of a stateful application, such as high availability across different sites (e.g., geographic areas or countries), but the use of domain-specific knowledge by the stateful application presents challenges for achieving high availability. Additionally, some stateful applications are single-instance stateful applications that are limited to one instance per computing cluster. One technique for obtaining high availability of a single-instance stateful application is the use of a stretched computing cluster, which is a computing cluster that is orchestrated to span multiple sites, but networking limitations may cause a stretched computing cluster to have poor performance.

In an example implementation consistent with the features disclosed herein, high availability of a single-instance stateful application is achieved by orchestrating multiple computing clusters at different sites. One of the computing clusters is designated as an active computing cluster and another of the computing clusters is designated as a passive computing cluster. A single-instance stateful application is deployed on each of the computing clusters. Resources that are used by the stateful application are synchronized between the computing clusters. The stateful application on the active computing cluster is scaled up, while the stateful application on the passive computing cluster is scaled down. Specifically, the stateful application on the active computing cluster is scaled to greater than zero such that it is deployed on at least one worker node of the active computing cluster, while the stateful application on the passive computing cluster is scaled to zero such that it is not deployed to worker nodes of the passive computing cluster. Thus, the stateful application runs on the active computing cluster but does not run on the passive computing cluster. If the active computing cluster goes down (e.g., due to malfunction, maintenance, etc.), the designation of the active/passive computing clusters is reversed and the stateful application on the new active computing cluster (e.g., the former passive computing cluster) is scaled up. Because the resources used by the stateful application are synchronized between the computing clusters, the new active computing cluster will have a copy of the resources used by the stateful application, and thus may begin running with low delay. Accordingly, high availability of the stateful application (specifically, active-passive high availability) may be achieved across different sites. Operation of a private cloud may thus be improved.

To enable client access to the stateful application, a load balancer is deployed and configured. Specifically, the load balancer is configured to route requests to whichever of the computing clusters is currently designated as the active computing cluster. When the designation of the active computing cluster is changed, the load balancer is updated to point to the current active computing cluster.

The computing clusters may be provided by a container management system. Such systems provide a platform for automating deployment, scaling, and operations of application containers across computing clusters of worker nodes. Computing cluster resources or components may be created, grouped, updated, and/or deleted, which operations may be automated. The basic scheduling unit of a container management system is a pod, which adds a higher level of abstraction by grouping containerized components. A pod includes containers that are co-located on the same worker node and can share resources. A service (e.g., a computing cluster service), which is an abstraction of the resources of a computing cluster, may be created at a computing cluster. A service includes one or more pods that work together to provide a function. A computing cluster may also include one or more controllers. A controller (e.g., a computing cluster controller) includes a control loop that watches the state of a computing cluster to track a resource of the computing cluster, and automatically makes or requests changes to the computing cluster based on the state of the resource. A controller may include one or more pods that implement the control loop. A cluster may also include one or more operators. Operators are software extensions to a cluster that use custom resources to manage applications and their components. An operator includes a controller, where the control loop of the controller watches the state of a cluster to track a custom resource of the cluster, and automatically makes or requests changes to the cluster based on the state of the custom resource.

Figure 1B:
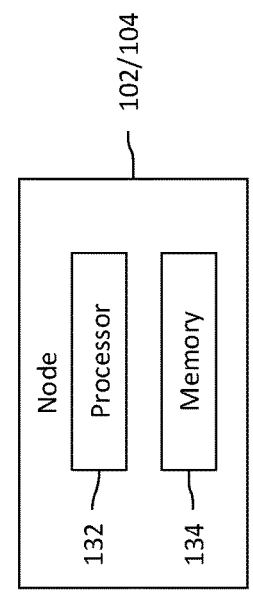

FIGS. 1A-1B are schematic diagrams of a computing cluster 100, according to some implementations. FIG. 1A is a diagram of components of the computing cluster 100 and FIG. 1B is a diagram of a computing node of the computing cluster 100. Referring to FIG. 1A, the computing cluster 100 includes a manager node 102, which is responsible for managing the computing cluster 100, and multiple worker nodes 104 (including a first worker node 104A and a second worker node 104B) within which the components of the computing cluster 100 are adapted to perform a requested cluster operation. Examples of such requested cluster operations can include operations to create an application deployment, delete an application deployment, update an application deployment, and the like.

The manager node 102 is the entry point of administrative tasks for the computing cluster 100 and is responsible for orchestrating the worker nodes 104, within which the components of the computing cluster 100 for generating a cluster operation are located. The manager node 102 includes an API server 106 that provides both the internal and external interface for access to the computing cluster 100 via the manager node 102. The API server 106 receives commands from a management interface 108. The commands may be representational state transfer (REST) command requests. The API server 106 processes the commands from the management interface 108, validates the commands, and executes logic specified by the commands.

The results of the commands processed by the API server 106 may be stored in a storage component 110. The storage component 110 may be a distributed key-value store, such as an etcd storage component, which may be included with the manager node 102. The storage component 110 stores configuration data of the computing cluster 100, representing the state of the computing cluster 100 (e.g., what pods exist, what pods should be running, which nodes should the pods be running on, etc.). The storage component 110 provides storage for the commands received by the API server 106 to perform create-read-update-and-delete (CRUD) operations as well as an interface to register watchers on specific nodes, thereby providing a reliable way to notify the rest of the computing cluster 100 about configuration changes within the computing cluster 100. For example, the information in the storage component 110 enables the manager node 102 to be notified about configuration changes such as jobs being scheduled, created, and deployed; pod/service details and states; namespaces and replication information; and the like.

The manager node 102 also includes a resource scheduler 112 and a controller manager 114. The resource scheduler 112 is adapted to deploy pods (and thus applications) onto the worker nodes 104. The resource scheduler 112 includes information regarding available resources on the computing cluster 100, as well as resources utilized for the applications to run. This information is used by the resource scheduler 112 to make decisions about where to deploy a specific application. The controller manager 114 manages controllers of the computing cluster 100. A controller uses the API server 106 to watch the state of one or more resource(s) of the computing cluster 100 and automatically make changes to the computing cluster 100 based on the state of the resource(s). For example, a controller may use the API server 106 to make changes to the current state of the computing cluster 100 to change the current state to another state, re-create a failed pod, remove an extra-scheduled pod, etc. In addition, the manager node 102 may include a DNS server 116, which serves DNS records for the components (e.g., pods and services) of the computing cluster 100. The node agents of the worker nodes 104 may use the DNS server 116 to resolve domain names.

Pods 118 (including first pods 118A and second pods 118B) are co-located in each of the worker nodes 104. Containers 120 (including first containers 120A and second containers 120B) reside within respective ones of the pods 118. The containers 120 are co-located on respective ones of the worker nodes 104 where the respective pods 118 are running, and may share resources. A pod 118 is a group of containerized components that share resources such as storage, namespaces, control groups, IP addresses, and the like. Each of the pods 118 is assigned an IP address within the computing cluster 100. A pod 118 may include a volume, such as a local disk directory or a network disk, and may expose the volume to the containers 120 within the pod 118. The pods 118 may be managed manually through the API server 106, or the management of the pods 118 may be automatically performed by a controller (managed by the controller manager 114).

The containers 120 include the minimum operating system resources, memory, and dependencies to run an application. Examples of the dependencies include files, environment variables, libraries, and the like. The host operating system for a worker node 104 constrains access of the containers 120 to physical resources of the worker node 104, such as CPUs, storage, memory, and the like. The worker nodes 104 may use virtualization to run the containers 120.

The pods 118 included in a worker node 104 are created, destroyed, and recreated based on the state of the computing cluster 100. Thus, the pods 118 may not be persistent or exist for a long period of time. Because of the relatively short lifespan of the pods 118, the IP address that they are served on may change. To facilitate communication with the pods 118 even when their IP addresses change, a service may be defined for certain pods 118. A service is an abstraction of a group of pods 118, typically using a proxy. A virtual IP address may be assigned to a service in order for other components to communicate with the service via the virtual IP address. Load balancing may be set up for at least some of the pods 118 so that the pods 118 may be exposed via a service. The pods 118 can be recreated and have changes to their corresponding IP protocol without the virtual IP address of the service being changed. Therefore, a service may be created having a stable IP address and DNS name, which can be used by other pods 118 to communicate with the service. For example, consider an image-processing back-end which is running with three replicas. Those replicas are fungible, in that a front-end does not care which image-processing back-end is used. While the pods 118 that compose the back-end set may change, the front-end clients, by communicating with the back-end via a service, may be unaware of those changes, such that the front-end clients do not keep track of a list of the back-end set. Each service of the containers 120 may be assigned a DNS name that identifies the pods 118 within which the service resides.

Each of the worker nodes 104 includes a node agent 122 (including a first node agent 122A and a second node agent 122B). A node agent 122 is in communication with the manager node 102 and receives details for the configuration of the pods 118 from the API server 106. The node agent 122 uses the received details to ensure that the containers 120 are constructed and running as intended. In addition, the node agent 122 may also receive information about services from the storage component 110 to obtain information related to services and to create details related to newly created services.

Additionally, each of the worker nodes 104 includes a proxy 124 (including a first proxy 124A and a second proxy 124B). Each proxy 124 functions as a network proxy, or hub through which requests are transferred, and as a load balancer for a service on a worker node 104 to reverse proxy and distribute network traffic across the containers 120. The proxies 124 are used to increase capacity and reliability of applications and to perform network routing for transmission control protocol (TCP) packets and user data protocol (UDP) packets. The proxies 124 route traffic to the appropriate container 120 in order to enable access to a service based on a virtual IP address of the service. The proxies 124 may also perform numbering of incoming requests, and that information may be used for creating a cluster operation. In this way, the components of the worker nodes 104 may be combined together and identified so that when an application is to be deployed, the components for creating and running the application are located throughout the worker nodes 104. If any of the worker nodes 104 are added or removed, the computing cluster 100 is able to create or deploy the application by combining components from different worker nodes 104 or using a combination of different components within the worker nodes 104.

In order to perform cluster operations in a container management system, a deployment configuration that provides instructions on how to create and update components for performing a cluster operation can be input to the manager node 102 via the management interface 108. Once the instructions on how to create and update the components for performing the cluster operation have been received by the manager node 102, the API server 106 schedules the cluster operation onto the worker nodes 104 to perform the cluster operation using a combination of multiple different components within multiple different containers 120 of multiple different pods 118. In this way, the cluster operation is performed using a combination of components located in multiple containers 120 located within one or more of the pods 118 within one or more of the worker nodes 104.

Once a cluster operation has been scheduled, the manager node 102 monitors the pods 118. If the manager node 102 determines that a resource used for the cluster operation located within one of the containers 120 of the pods 118 goes down or is deleted, the manager node 102 replaces the deleted or nonoperating pod 118 associated with the cluster operation using a different combination of the currently available resources within the containers 120 of the pods 118. In this way, the API server 106 monitors the functionality of the pods 118, and when the pods 118 no longer function as intended, recreates the pod 118.

The manager node 102 also includes one or more computing cluster operators, such as an application operator 126. A computing cluster operator is a software extension for the container management system that allows the behavior of the computing cluster 100 to be extended, such as by extending the API server 106. An operator uses custom resources to manage an application and its components.

Custom resources are resources of the computing cluster 100 that are customized to an application, and are defined by custom resource definitions (CRDs). The custom resources may be stored in the storage component 110. The configuration and settings for an application may be stored within a custom resource for an operator. An operator includes an application-specific controller (and one or more associated pods 118), which is managed by the controller manager 114. The controller of an operator is linked to application-specific custom resources. Specifically, the controller of an operator includes a control loop that tracks the application-specific custom resources and performs actions based on those resources. The application operator 126 is an operator for an operator-based application. An operator-based application is a single-instance stateful application, which operates using custom resources. Thus, the operator-based application may be directly controlled by using the management interface 108 to interact with the custom resources. In an example implementation, the computing cluster 100 is a Kubernetes® Cluster, the application operator 126 is a Kubernetes® Operator, and the operator-based application is an application for monitoring the computing cluster 100, such as Prometheus.

The manager node 102 also includes one or more computing cluster controllers, such as a cluster group controller 128, which is managed by the controller manager 114. A computing cluster controller includes a control loop that tracks a resource of the computing cluster 100, and automatically makes or requests changes to the computing cluster 100 based on the state of the resource. As subsequently described in greater detail, multiple computing clusters 100 will be utilized to achieve high availability for the operator-based application of the application operator 126. The cluster group controllers 128 of the computing clusters 100 will be used to coordinate the computing clusters 100 so that the operator-based application is deployed on each of the computing clusters 100, but only one instance of the operator-based application is running across the computing clusters 100 at a given time. The operation of the cluster group controller 128 will be subsequently described in greater detail.

The nodes of the computing cluster 100 (e.g., the manager node 102 and the worker nodes 104) may each include suitable components. Suitable components include a processor, an application-specific integrated circuit, a microcontroller, memory, and the like. The nodes of the computing cluster 100 may each be physical devices, e.g., computers. For example, and referring to FIG. 1B, the manager node 102 and the worker nodes 104 may each include a processor 132 and a memory 134. The memory 134 may be a non-transitory computer readable medium storing instructions for execution by the processor 132. One or more modules within the nodes of the computing cluster 100 may be partially or wholly embodied as software and/or hardware for performing any functionality described herein.

Figure 2:
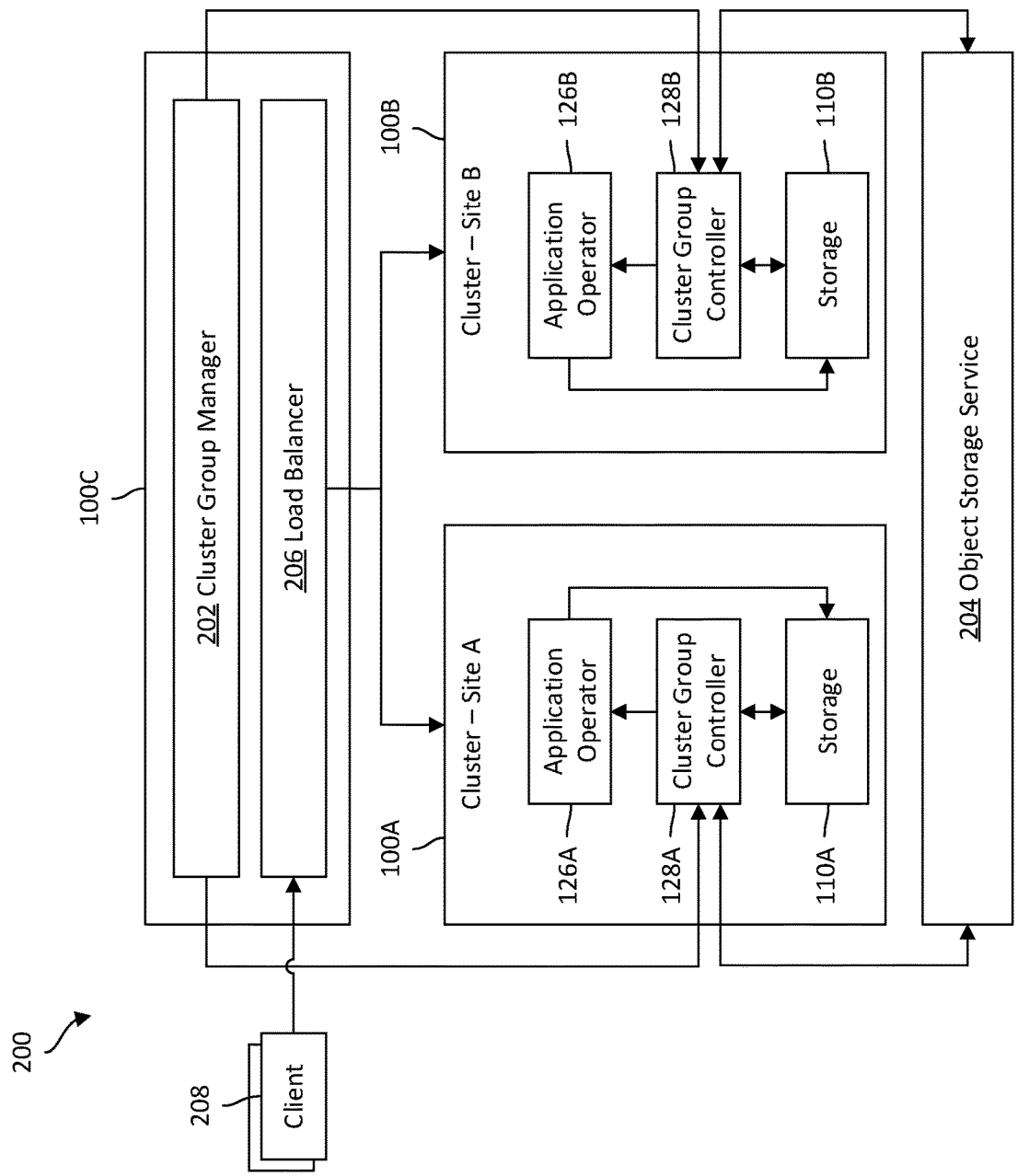
FIG. 2 is a schematic diagram of an active-passive computing cluster system, according to some implementations.

FIG. 2 is a schematic diagram of an active-passive computing cluster system 200, according to some implementations. In the active-passive computing cluster system 200, multiple computing clusters 100 (including a first computing cluster 100A and a second computing cluster 100B) are grouped together and used to achieve high availability of a single-instance stateful application, such as an operator-based application. The first computing cluster 100A may be disposed at a first site (e.g., Site A) and the second computing cluster 100B may be disposed at a second site (e.g., Site B) that is different than the first site. Specifically, the first site may be in a different geographic area than the second site, such that the first computing cluster 100A and the second computing cluster 100B are disposed in different geographic areas.

The active-passive computing cluster system 200 includes a cluster group manager 202 and an object storage service 204. The cluster group manager 202 may be a computing cluster controller, which is deployed on a managing computing cluster 100C. The cluster group manager 202 controls the computing clusters 100 that have been registered as group members, so that they are grouped together in a high availability cluster group. The cluster group controllers 128 (including a first cluster group controller 128A and a second cluster group controller 128B) of the respective computing clusters 100 handle deployment commands from the cluster group manager 202. The cluster group manager 202 sends the deployment commands to the cluster group controllers 128 in order to coordinate the computing clusters 100 so that an operator-based application is deployed on each of the computing clusters 100, but only one instance of the operator-based application is running across the computing clusters 100 at a given time. The storage components 110 (including a first storage component 110A and a second storage component 110B) of the respective computing clusters 100 store custom resources defined for the operator-based application. The object storage service 204 will be used to facilitate synchronization of the custom resources for the operator-based application between the storage components 110. The object storage service 204 may be a cloud object storage service such as an Amazon Simple Storage Service (S3) bucket or the like. In an example implementation, the storage components 110 are not bulk-synced via the object storage service 204, but rather, only the custom resources defined for the operator-based application are synced.

Initially, the operator-based application along with its custom resource definitions (CRDs) is deployed in each of the computing clusters 100. Thus, the computing clusters 100 may include application operators 126 (including a first application operator 126A and a second application operator 126B), on which the operator-based application is deployed. The cluster group manager 202 designates one site as an active site and the other sites as a passive sites. In this example, the active-passive computing cluster system 200 includes one passive site, but multiple passive sites may be utilized. The selection of the active/passive sites may be performed via set rules or by manual enforcement (e.g., by an administrator of the active-passive computing cluster system 200 using a management interface for the managing computing cluster 100C). The cluster group controller 128 in the passive site then scales down the application operator 126 of the respective computing cluster 100 to zero. Specifically, the application operators 126 include pods, and the quantity of pods for the application operator 126 at the passive site is set to zero. Additionally, the cluster group controller 128 in the active site then scales up the application operator 126 of the respective computing cluster 100 to greater than zero. Specifically, the quantity of pods for the application operator 126 at the active site is set to greater than zero, such as one. As a result, only one instance of the operator-based application runs at a given time across the computing clusters 100.

The application operators 126 include control loops that change the computing clusters 100 based on custom resources of the operator-based application that are stored in the storage components 110. Synchronization of the custom resources between the computing clusters 100 is performed using the object storage service 204. The cluster group controllers 128 sync the custom resources of the respective storage components 110 to and from the object storage service 204. As a result, custom resources written to the storage component 110 of one computing cluster are synchronized to the storage component 110 of the other computing cluster. During operation, the cluster group controller 128 in the active site writes to its storage component 110, while the cluster group controller 128 in the passive site does not write to its storage component 110 on account of that cluster group controller 128 being scaled to zero (e.g., not running). As a result, the custom resources at the passive site are nonfunctional copies of the custom resources at the active site.

The active-passive computing cluster system 200 further includes a load balancer 206. The load balancer 206 may be a computing cluster service, which is deployed on the managing computing cluster 100C. A computing cluster service includes one or more pods 118 (see FIG. 1) that work together to provide a function, e.g., load balancing in the case of the load balancer 206. The load balancer 206 is configured to route requests from clients 208 to the computing cluster 100 of the active site.

Requests that interact with the custom resources at the active site result in the data for the custom resources being synced to the passive site. When the active site goes down (e.g., due to malfunction, maintenance, etc.), the cluster group manager 202 designates the former passive site as the new active site, such that the roles of the former active/passive sites are reversed. The cluster group controller 128 in the new active site scales up the application operator 126 running in the respective computing cluster 100 to greater than zero, while the cluster group controller 128 in the former active site scales down the application operator 126 running in the respective computing cluster 100 to zero. The load balancer 206 is reconfigured to route requests from the clients 208 to the computing cluster 100 of the new active site. As a result, high availability of the operator-based application may be achieved at the application layer. Availability of the operator-based application may thus be improved across sites without changes to site infrastructure.

Figure 3:
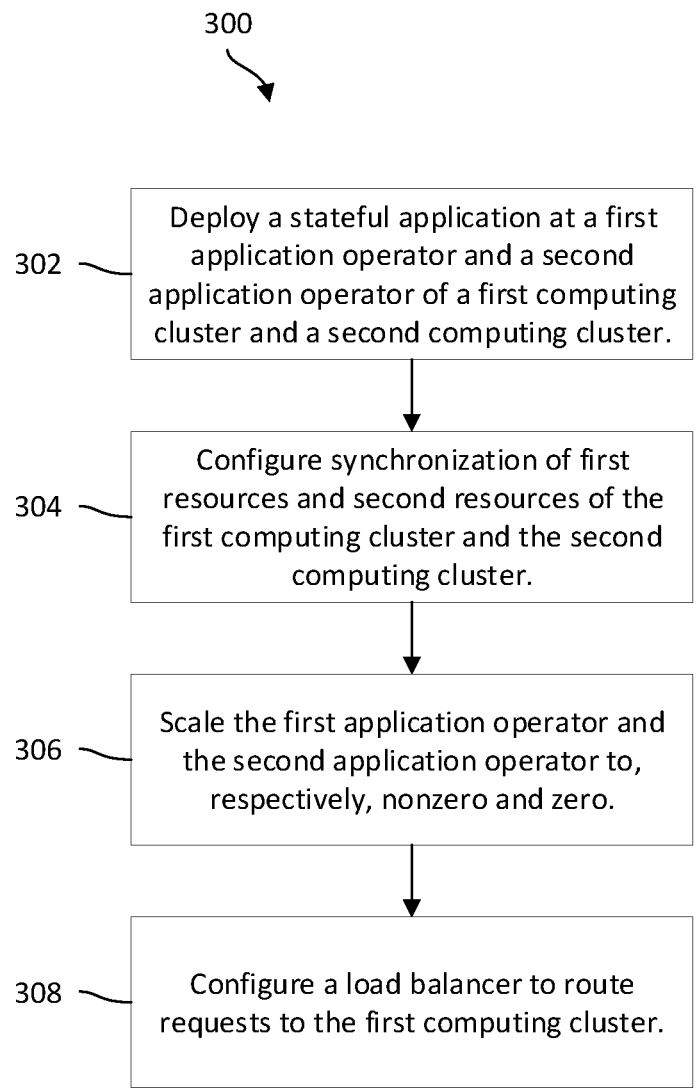
FIG. 3 is a diagram of a computing cluster group deployment method, according to some implementations.

FIG. 3 is a diagram of a computing cluster group deployment method 300, according to some implementations. The computing cluster group deployment method 300 will be described in conjunction with FIG. 2. The computing cluster group deployment method 300 may be performed by the cluster group manager 202 when setting up the first computing cluster 100A and the second computing cluster 100B for high availability.

In step 302, a stateful application is deployed at a first application operator 126A and a second application operator 126B of a first computing cluster 100A and a second computing cluster 100B, respectively. The first application operator 126A includes a first control loop that changes the first computing cluster 100A based on first custom resources of the first computing cluster 100A. The second application operator 126B includes a second control loop that changes the second computing cluster 100B based on second custom resources of the second computing cluster 100B. The stateful application may be an operator-based application. The cluster group manager 202 may deploy the stateful application by sending deployment commands that command the first cluster group controller 128A and the second cluster group controller 128B to deploy a copy of the stateful application to the first application operator 126A and the second application operator 126B, respectively.

In step 304, synchronization of the first custom resources with the second custom resources is configured. The first custom resources are stored in a first storage component 110A of the first computing cluster 100A. The second custom resources are stored in a second storage component 110B of the second computing cluster 100B. The first storage component 110A and the second storage component 110B may each be configured to synchronize with one another via an object storage service 204. In an example implementation where the first storage component 110A is a first key-value store and the second storage component 110B is a second key-value store, the key-value stores will be synchronized with one another. The cluster group manager 202 may configure synchronization of the custom resources by sending deployment commands that command the first cluster group controller 128A and the second cluster group controller 128B to begin synchronizing the custom resources stored in the first computing cluster 100A and the second storage component 110B, respectively, with the object storage service 204.

In step 306, the first application operator 126A and the second application operator 126B are scaled to, respectively, nonzero and zero. The first control loop of the first application operator 126A may be executed by a first manager node of the first computing cluster 100A, while the first application operator 126A may include first pods deployed to first worker nodes of the first computing cluster 100A. Scaling the first application operator 126A to nonzero may include setting a first quantity of the first pods to greater than zero, such as one. Similarly, the second control loop of the second application operator 126B may be executed by a second manager node of the second computing cluster 100B, while the second application operator 126B may include second pods deployed to second worker nodes of the second computing cluster 100B. Scaling the second application operator 126B to zero may include setting a second quantity of the second pods to zero. Thus, the first quantity of the first pods is greater than the second quantity of the second pods. The cluster group manager 202 may scale the first application operator 126A and the second application operator 126B by sending deployment commands that command the first cluster group controller 128A to scale up the first application operator 126A and command the second cluster group controller 128B to scale down the second application operator 126B.

In step 308, a load balancer 206 is configured to route requests to the first computing cluster 100A. At this point, the first computing cluster 100A is configured as an active computing cluster and the second computing cluster 100B is configured as a passive computing cluster. As such, requests from clients 208 are routed to the active computing cluster. The cluster group manager 202 may configure the load balancer 206 by sending deployment commands that command the load balancer 206 to change load balancing weights, such that the active computing cluster is more heavily weighted than the passive computing cluster for load balancing decisions. In an example, the load balancing weights are set to zero for the passive computing cluster and are set to nonzero for the active computing cluster.

Additional steps may be performed. In an example implementation, the cluster group manager 202 deploys the first cluster group controller 128A and the second cluster group controller 128B to the first computing cluster 100A and the second computing cluster 100B, respectively, before other steps are performed. For example, when the first cluster group controller 128A and the second cluster group controller 128B are computing cluster controllers, they may be orchestrated on the first computing cluster 100A and the second computing cluster 100B via the respective API servers for the computing clusters.

The computing cluster group deployment method 300 is performed initially, during deployment of the active-passive computing cluster system 200. Once complete, the active-passive computing cluster system 200 provides high availability of the operator-based application deployed at the first application operator 126A and the second application operator 126B. During operation, the current active computing cluster may go down (e.g., due to malfunction, maintenance, etc.). When the current active computing cluster goes down, the cluster group manager 202 designates a new computing cluster as the active computing cluster and a new computing cluster as the passive computing cluster. The role of the former active/passive computing clusters are thus reversed.

Figure 4A:
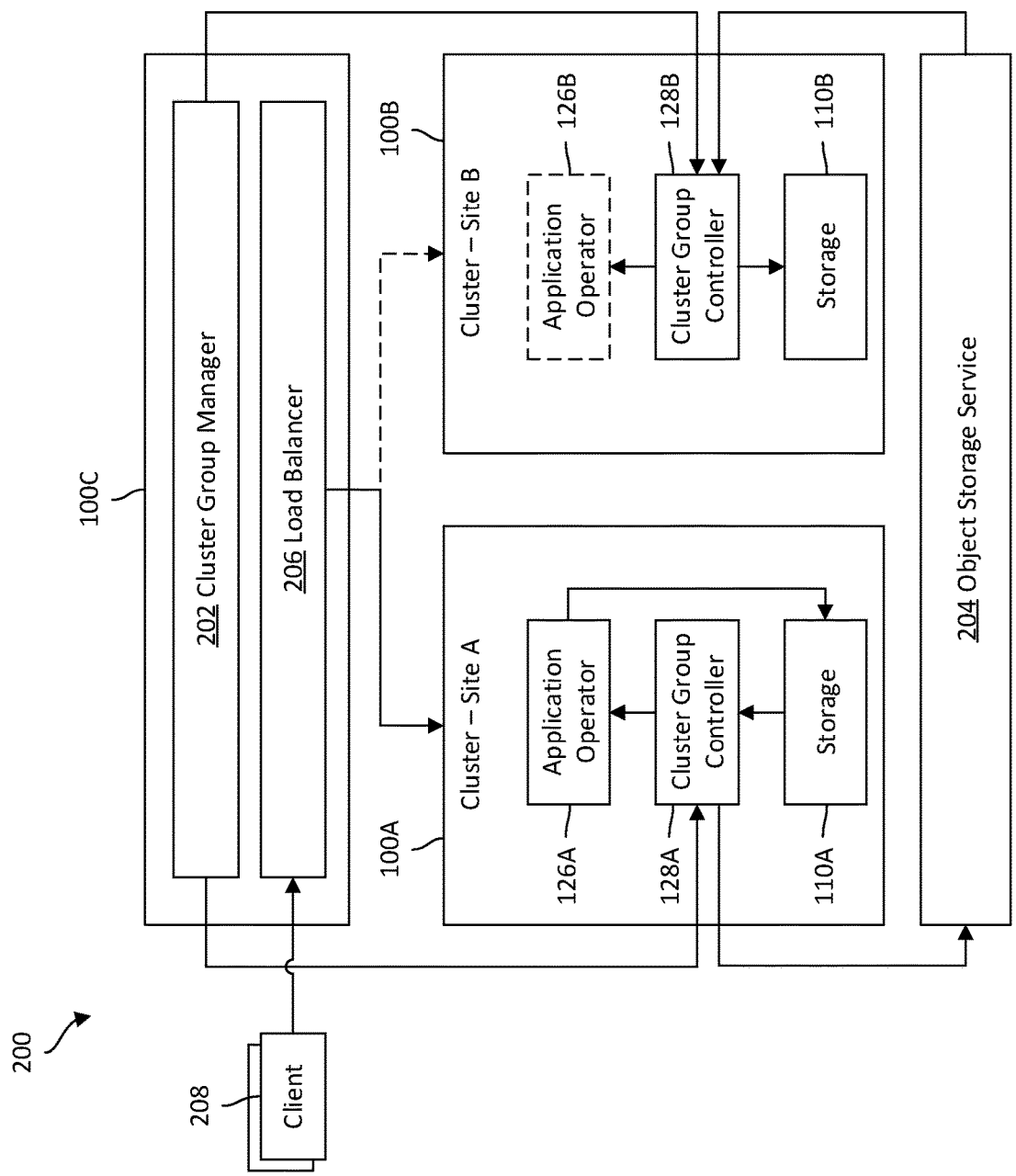
FIGS. 4A-4B are schematic diagrams of an active-passive computing cluster system during operation, according to some implementations.
Figure 4B:
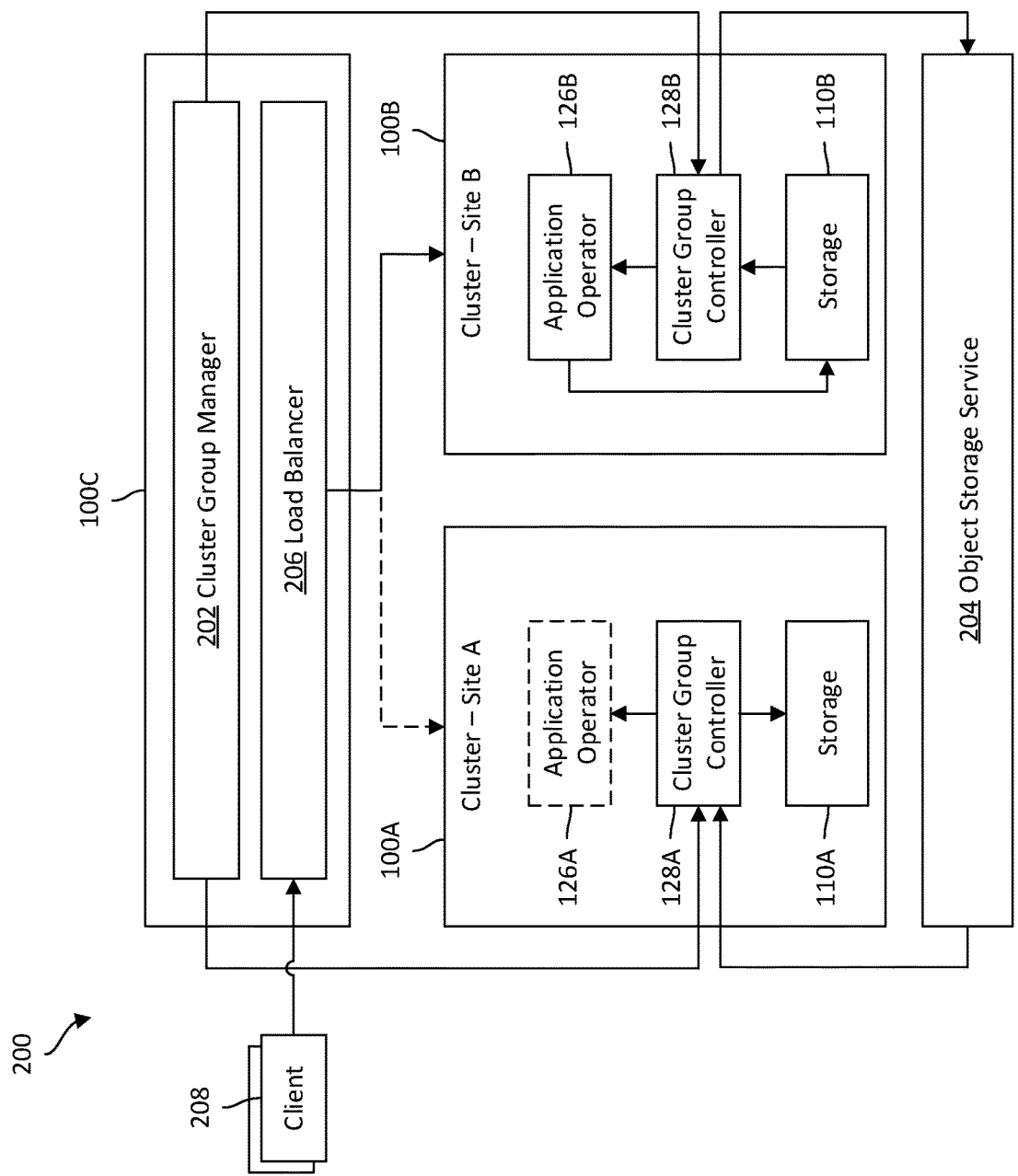

FIGS. 4A-4B are schematic diagrams of the active-passive computing cluster system 200 during operation, according to some implementations. An application operator 126 for a stateful application is deployed on each of the computing clusters 100.

In a first active-passive configuration shown in FIG. 4A, the first computing cluster 100A is designated as the active computing cluster while the second computing cluster 100B is designated as the passive computing cluster. The first application operator 126A running in the first computing cluster 100A is scaled to greater than zero, while the second application operator 126B running in the second computing cluster 100B is scaled to zero. The first application operator 126A interacts with custom resources stored in the first storage component 110A, and changes to those custom resources are synchronized to the second storage component 110B. The load balancer 206 is configured to route requests to the first computing cluster 100A.

In a second active-passive configuration shown in FIG. 4B, the first computing cluster 100A is designated as the passive computing cluster while the second computing cluster 100B is designated as the active computing cluster. The first application operator 126A running in the first computing cluster 100A is scaled to zero, while the second application operator 126B running in the second computing cluster 100B is scaled to greater than zero. The second application operator 126B interacts with custom resources stored in the second storage component 110B, and changes to those custom resources are synchronized to the first storage component 110A. The load balancer 206 is configured to route requests to the second computing cluster 100B.

As previously noted, the custom resources for the operator-based application are synchronized between the first storage component 110A and the second storage component 110B. As a result, when the designation of the active/passive computing clusters is changed, the application operator 126 of the new active computing cluster will have a copy of the custom resources used by the operator-based application. Thus, the operator-based application may begin running with low delay at whichever computing cluster it is scaled up. Further, the state of the operator-based application is maintained when the active/passive computing site designation is changed.

Figure 5:
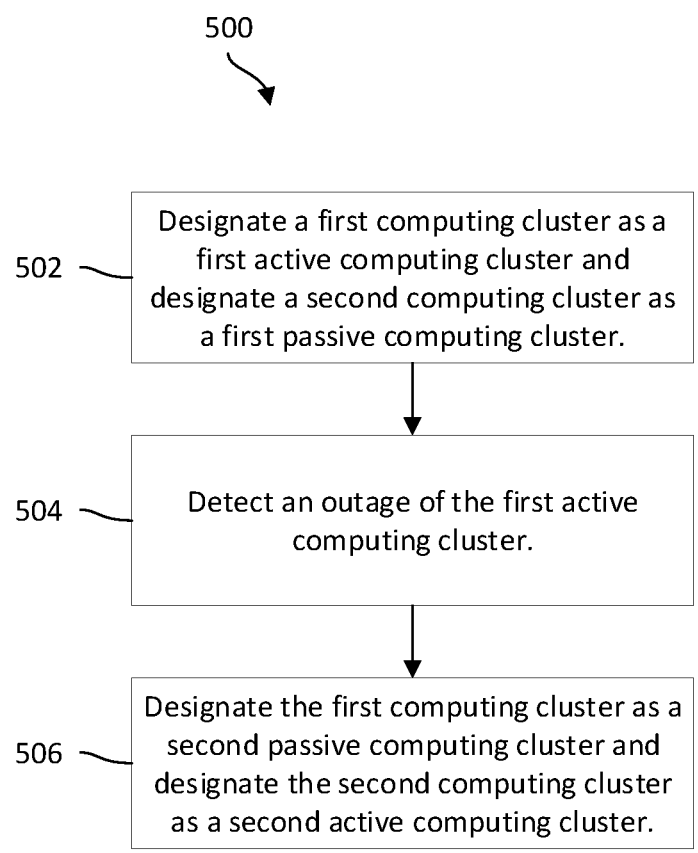
FIG. 5 is a diagram of a computing cluster group reconfiguration method, according to some implementations.

FIG. 5 is a diagram of a computing cluster group reconfiguration method 500, according to some implementations. The computing cluster group reconfiguration method 500 will be described in conjunction with FIGS. 4A-4B. The computing cluster group reconfiguration method 500 may be performed by the cluster group manager 202 during failover, e.g., when reconfiguring the first computing cluster 100A and the second computing cluster 100B for high availability.

In step 502, a first computing cluster 100A is designated as a first active computing cluster and a second computing cluster 100B is designated as a first passive computing cluster. A stateful application is deployed at a first application operator 126A and a second application operator 126B of the first computing cluster 100A and the second computing cluster 100B, respectively. The stateful application may be an operator-based application. The first application operator 126A of the first active computing cluster and the second application operator 126B of the first passive computing cluster are scaled to, respectively, nonzero and zero. Additionally, a load balancer 206 is configured to route requests to the first active computing cluster (e.g., the first computing cluster 100A). As such, the active-passive computing cluster system 200 is set to a first active-passive configuration (see FIG. 4A).

In step 504, an outage of the first active computing cluster (e.g., the first computing cluster 100A) is detected by the cluster group manager 202. The first active computing cluster may go down due to malfunction, maintenance, etc. The cluster group manager 202 may detect the outage by receiving an outage message from the first cluster group controller 128A, by detecting a loss of connection with the first cluster group controller 128A, etc. In an example implementation, the cluster group manager 202 detects the outage based on information of the container management system, such as information stored in the storage components 110 of the computing clusters. Specifically, custom resources of the computing clusters may be considered when detecting the outage. The information in the storage components 110 may be used to detect a lack of an application's availability due to a resource shortage or an outage.

In step 506, the first computing cluster 100A is designated as a second passive computing cluster and the second computing cluster 100B is designated as a second active computing cluster, in response to detecting the outage. The first application operator 126A of the second passive computing cluster and the second application operator 126B of the second active computing cluster are scaled to, respectively, zero and nonzero. Additionally, the load balancer 206 is configured to route requests to the second active computing cluster (e.g., the second computing cluster 100B). As such, the active-passive computing cluster system 200 is set to a second active-passive configuration (see FIG. 4B) that is different than the first active-passive configuration. At this point, the designation of the active/passive computing clusters is reversed. Thus, requests from clients 208 are routed to the second active computing cluster (formerly the first passive computing cluster) instead of to the first active computing cluster (now the second passive computing cluster). When the designation of the active/passive computing clusters is reversed, the second active computing cluster will have a copy of the custom resources used by the operator-based application, and thus may begin running with low delay. The operator-based application will thus begin running at the second active computing cluster in the same state as it was formerly running at the first active computing cluster.

Some variations are contemplated. In an example implementation, the operator-based application also uses data stored on a persistent volume (e.g., of the pods 118) for state persistence. In such an implementation, the persistent volume may be migrated from the former active computing cluster to the new active computing cluster during a failover. The migration may be performed by a volume migration procedure instead of by synchronizing the volume through the object storage service 204. For example, the persistent volume may be copied from the respective pods of the first computing cluster 100A to the respective pods of the second computing cluster 100B. Performing volume migration may increase failover delay, but may be more efficient than volume synchronization due to networking limitations. In another example implementation, multiple computing clusters may be grouped, and the groups considered as a single unit for active/passive designation. An active group of multiple active computing clusters may be running multiple operator-based applications. When an outage is detected for any one of the applications in the active group, then the computing clusters in the active group may be scaled down, and corresponding computing clusters in a previous passive group may be scaled up. The load balancer 206 may then be reconfigured so that the operator-based applications in the new active group are used to handle client requests.

In an example implementation consistent with the features disclosed herein, a method includes: deploying a stateful application at a first application operator and a second application operator of a first computing cluster and a second computing cluster, respectively, the first application operator including a first control loop that changes the first computing cluster based on first resources of the first computing cluster, the second application operator including a second control loop that changes the second computing cluster based on second resources of the second computing cluster; configuring synchronization of the first resources with the second resources; scaling the first application operator and the second application operator to, respectively, nonzero and zero; and configuring a load balancer to route requests to the first computing cluster. In another example implementation, the method further includes: scaling the first application operator and the second application operator to, respectively, zero and nonzero; and reconfiguring the load balancer to route requests to the second computing cluster. In another example implementation of the method: the first computing cluster includes a first manager node and first worker nodes, the first manager node executing the first control loop, the first application operator further including first pods on the first worker nodes; and the second computing cluster includes a second manager node and second worker nodes, the second manager node executing the second control loop, the second application operator further including second pods on the second worker nodes. In another example implementation of the method, scaling the first application operator and the second application operator includes: setting a first quantity of the first pods to greater than zero; and setting a second quantity of the second pods to zero. In another example implementation of the method, the first resources are stored in a first key-value store of the first computing cluster, the second resources are stored in a second key-value store of the second computing cluster, and configuring synchronization of the first resources and the second resources includes: configuring synchronization of the first key-value store with the second key-value store. In another example implementation of the method, the first key-value store and the second key-value store are synchronized through a cloud object storage service. In another example implementation of the method, deploying the stateful application includes: deploying custom resource definitions for the first resources and the second resources on the first computing cluster and the second computing cluster, respectively. In another example implementation, the method further includes: deploying a first cluster group controller and a second cluster group controller at, respectively, the first computing cluster and the second computing cluster, where scaling the first application operator and the second application operator includes sending deployment commands that command the first cluster group controller to scale up the first application operator and command the second cluster group controller to scale down the second application operator. In another example implementation of the method, the stateful application is a single-instance stateful application.

In an example implementation consistent with the features disclosed herein, a system includes: a plurality of computing clusters, each of the computing clusters including resources; a cluster group manager configured to: deploy a stateful application on each respective computing cluster of the computing clusters, the stateful application including a control loop that changes the respective computing cluster based on the resources of the respective computing cluster; designate one of the computing clusters as an active computing cluster and another of the computing clusters as a passive computing cluster; scale the stateful application on the active computing cluster to greater than zero; and scale the stateful application on the passive computing cluster to zero. In another example implementation of the system, the cluster group manager is further configured to: configure a load balancer to route requests to the active computing cluster. In another example implementation of the system, the cluster group manager is further configured to: configure synchronization of the resources of the active computing cluster and the passive computing cluster. In another example implementation of the system, the resources of the active computing cluster and the passive computing cluster are synchronized through an object storage service. In another example implementation of the system, the cluster group manager is further configured to: reverse designation of the active computing cluster and the passive computing cluster in response to detecting an outage of the active computing cluster. In another example implementation of the system, the outage of the active computing cluster is detected based on the resources of the active computing cluster.

In an example implementation consistent with the features disclosed herein, a non-transitory computer readable medium stores instructions which, when executed by a processor, cause the processor to: deploy a stateful application at a first application operator and a second application operator of a first computing cluster and a second computing cluster, respectively, the first application operator including a first control loop that changes the first computing cluster based on first resources of the first computing cluster, the second application operator including a second control loop that changes the second computing cluster based on second resources of the second computing cluster, the first computing cluster and the second computing cluster disposed in different geographic areas; configure synchronization of the first resources and the second resources via an object storage service; scale the first application operator and the second application operator to, respectively, nonzero and zero; and configure a load balancer to route requests to the first computing cluster. In another example implementation, the non-transitory computer readable medium further stores instructions which, when executed by the processor, cause the processor to: scale the first application operator and the second application operator to, respectively, zero and nonzero, in response to detecting an outage of the first computing cluster; and reconfigure the load balancer to route requests to the second computing cluster. In another example implementation of the non-transitory computer readable medium: the first computing cluster includes a first manager node and first worker nodes, the first manager node executing the first control loop, the first application operator further including first pods on the first worker nodes; the second computing cluster includes a second manager node and second worker nodes, the second manager node executing the second control loop, the second application operator further including second pods on the second worker nodes; and the instructions to scale the first application operator and the second application operator include instructions to: set a first quantity of the first pods to one; and set a second quantity of the second pods to zero. In another example implementation of the non-transitory computer readable medium, the instructions to deploy the stateful application include instructions to: deploy custom resource definitions for the first resources and the second resources on the first computing cluster and the second computing cluster. In another example implementation of the non-transitory computer readable medium, the stateful application is a single-instance stateful application.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A method comprising:
   deploying a stateful application at a first application operator and a second application operator of a first computing cluster and a second computing cluster, respectively, the first application operator comprising a first control loop that changes the first computing cluster based on first resources of the first computing cluster, the second application operator comprising a second control loop that changes the second computing cluster based on second resources of the second computing cluster;
   configuring synchronization of the first resources with the second resources;
   scaling the first application operator and the second application operator to, respectively, nonzero and zero; and
   configuring a load balancer to route requests to the first computing cluster,
   wherein the first computing cluster comprises a first manager node and first worker nodes, the first manager node executing the first control loop, the first application operator further comprising first pods on the first worker nodes; and
   the second computing cluster comprises a second manager node and second worker nodes, the second manager node executing the second control loop, the second application operator further comprising second pods on the second worker nodes.

2. The method of claim 1, further comprising:
   scaling the first application operator and the second application operator to, respectively, zero and nonzero; and
   reconfiguring the load balancer to route requests to the second computing cluster.

3. The method of claim 1, wherein scaling the first application operator and the second application operator comprises:
   setting a first quantity of the first pods to greater than zero; and
   setting a second quantity of the second pods to zero.

4. The method of claim 1, wherein the first resources are stored in a first key-value store of the first computing cluster, the second resources are stored in a second key-value store of the second computing cluster, and configuring synchronization of the first resources and the second resources comprises:
configuring synchronization of the first key-value store with the second key-value store.

5. The method of claim 4, wherein the first key-value store and the second key-value store are synchronized through a cloud object storage service.

6. The method of claim 1, wherein deploying the stateful application comprises:
deploying custom resource definitions for the first resources and the second resources on the first computing cluster and the second computing cluster, respectively.

7. The method of claim 1, further comprising:
deploying a first cluster group controller and a second cluster group controller at, respectively, the first computing cluster and the second computing cluster,
wherein scaling the first application operator and the second application operator comprises sending deployment commands that command the first cluster group controller to scale up the first application operator and command the second cluster group controller to scale down the second application operator.

8. The method of claim 1, wherein the stateful application is a single-instance stateful application.

9. A non-transitory computer readable medium storing instructions which, when executed by a processor, cause the processor to:
deploy a stateful application at a first application operator and a second application operator of a first computing cluster and a second computing cluster, respectively, the first application operator comprising a first control loop that changes the first computing cluster based on first resources of the first computing cluster, the second application operator comprising a second control loop that changes the second computing cluster based on second resources of the second computing cluster, the first computing cluster and the second computing cluster disposed in different geographic areas;
configure synchronization of the first resources and the second resources via an object storage service;
scale the first application operator and the second application operator to, respectively, nonzero and zero; and
configure a load balancer to route requests to the first computing cluster, wherein:
the first computing cluster comprises a first manager node and first worker nodes, the first manager node executing the first control loop, the first application operator further comprising first pods on the first worker nodes;
the second computing cluster comprises a second manager node and second worker nodes, the second manager node executing the second control loop, the second application operator further comprising second pods on the second worker nodes; and
the instructions to scale the first application operator and the second application operator comprise instructions to:
set a first quantity of the first pods to one; and
set a second quantity of the second pods to zero.

10. The non-transitory computer readable medium of claim 9, further storing instructions which, when executed by the processor, cause the processor to:
scale the first application operator and the second application operator to, respectively, zero and nonzero, in response to detecting an outage of the first computing cluster; and
reconfigure the load balancer to route requests to the second computing cluster.

11. The non-transitory computer readable medium of claim 9, wherein the instructions to deploy the stateful application comprise instructions to:
deploy custom resource definitions for the first resources and the second resources on the first computing cluster and the second computing cluster.

12. The non-transitory computer readable medium of claim 9, wherein the stateful application is a single-instance stateful application.

* * * * *